US005507988A

United States Patent [19]

Eagan et al.

[11] Patent Number: 5,507,988

[45] Date of Patent: Apr. 16, 1996

[54] PROCESS AND APPARATUS FOR FORMING A BUILDING BLOCK

[76] Inventors: Thomas G. Eagan; Susan A. Eagan, both of 13110 Los Espanada, San Antonio, Tex. 78233

[21] Appl. No.: 273,655

[22] Filed: Jul. 12, 1994

[51] Int. Cl.[6] .................................................. B29C 43/02

[52] U.S. Cl. ......................... 264/122; 264/109; 264/115; 425/62; 425/135; 425/202; 425/209; 425/256; 425/412

[58] Field of Search .................................. 264/115, 122, 264/109; 425/62, 135, 202, 205, 209, 256, 261, 412

[56] References Cited

U.S. PATENT DOCUMENTS

| | | | |
|---|---|---|---|
| 1,410,166 | 3/1922 | Clouser et al. | 425/412 |
| 4,704,316 | 11/1987 | Grace | 264/115 |
| 5,059,372 | 10/1991 | Klais | 264/120 |
| 5,076,986 | 12/1991 | Delvaux et al. | 264/122 |
| 5,252,276 | 10/1993 | Marpozan et al. | 264/120 |

*Primary Examiner*—Mary Lynn Theisen

[57] ABSTRACT

There is disclosed a novel process and apparatus for producing a light weight, self aligning, building block from straw, corn stalks, sugar cane, kenaf and like vegetable based fibrous materials wherein the vegetable based fibrous material is used as an aggregate base to be beat/mixed with one or more binders, sprayed with one or more wetting agents and deposited in to a mold to be subjected to sufficient compression forces having certain alignment enforcing capabilities, to form a pre-determined size, shape, density and thickness finished building block, then ejected for sufficient curing.

20 Claims, 4 Drawing Sheets

3 b 3 a

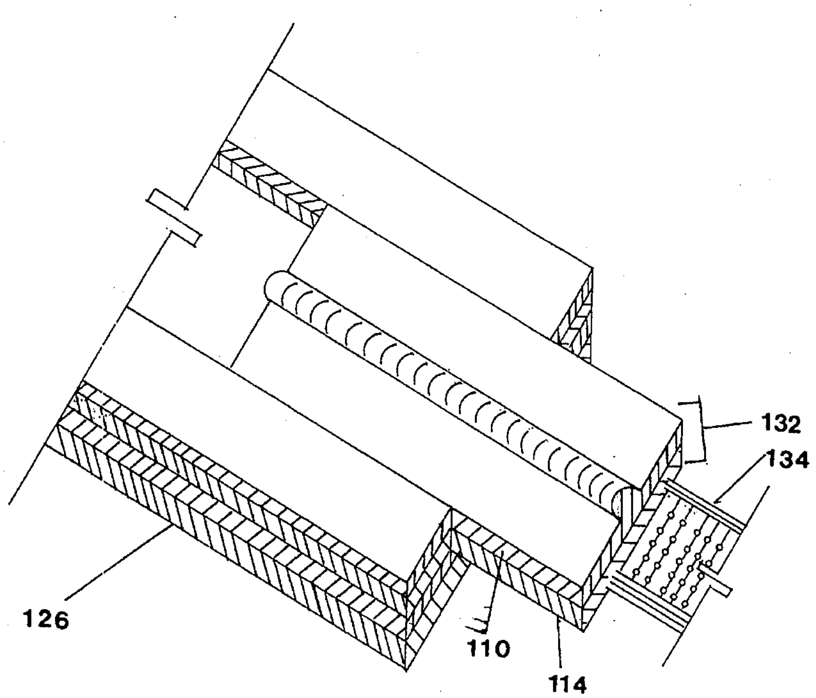
FIG 5
FIG 7
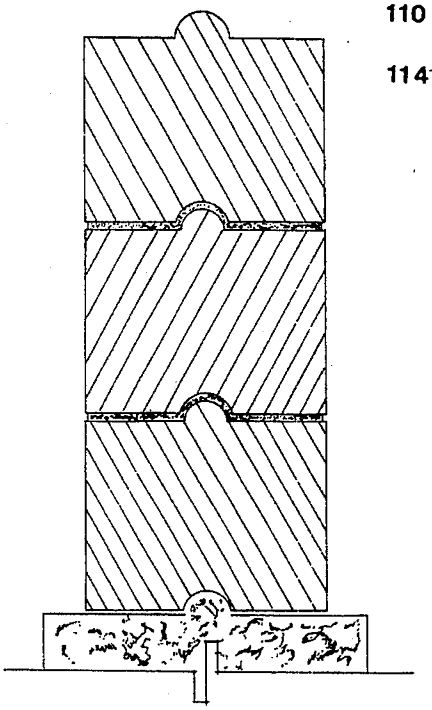
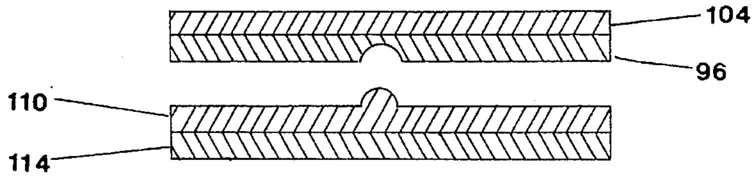
FIG 8
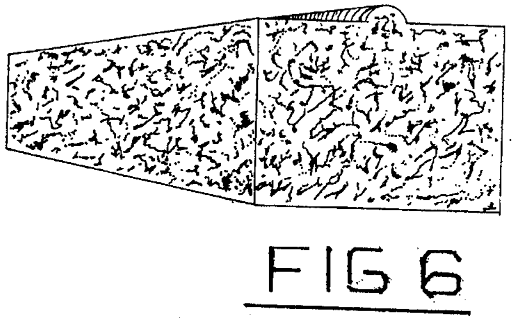
FIG 6

PROCESS AND APPARATUS FOR FORMING A BUILDING BLOCK

BACKGROUND-FIELD OF INVENTION

This invention relates to structurally independent building blocks, specifically to light weight, non-earthen aggregate based, self-insulating, self-aligning, structurally independent building blocks.

BACKGROUND-RELATED ART

The world is engaged in a complex competition to discover the most efficient use of diminishing or rationed resources. Most would agree that every effort must be made to discover new, structurally independent, building block systems. Particularly systems that rely on naturally renewable resources. Systems that result in, lower production costs, lighter building components, increased energy efficiency, and in lowering the skill levels required in erecting such systems. To achieve these objectives, and to discover in the process, a higher value-added use of a common, abundantly available, residual, renewable resource such as straw and other vegetable based fibrous materials represents a novel breakthrough.

Throughout history the challenge to improve productivity in structurally supportive, exterior and interior wall systems has remained elusive. Past efforts have focused essentially on attempts to lighten the product and improve surface coverage value, thus lowering production cost. Although numerous attempts have been made to improve insulation value and to lessen the skill levels required to erect such systems, their commercial acceptance has been minimal. For all intents and purposes, commercial use and applications of earthen based building block wall systems, as well as their use in residential applications has essentially remained unchanged.

This lack of effective innovation has contributed to keeping affordable housing an elusive objective. While industrialization has helped restrain the magnitude of cost increases in traditional stick built systems, the construction industry as a whole has registered the lowest productivity gains of all industries.

A novel and fundamental wall building component, made from a naturally renewable, energy efficient aggregate base, that does reduce erection skill levels to the do-it-yourself level holds the promise of a vital and novel cornerstone for a new generation of related do-it-yourself technologies.

Baled straw, sugar cane, corn stalks, banana leaves, palm fronds and the like have been used for hundreds of years as an in-fill wall material, when used with post and beam construction techniques around the world. Their use as a primary structural component has been limited or restricted due to a lack of any inherent compressive strength.

Traditional cement block systems relying primarily on earthen type aggregate bases such as sand, crushed stone or shell aggregate that inherently make them heavy, afford little insulation value and require greater skills and labor in erecting.

Traditional stick built systems that utilize dimensional lumber members or pressed steel members to achieve structural integrity suffer from increasing environmental pressures to limit forest harvesting, restrictive surface mining regulations, as well as the increasing pressures of a diminishing, skilled labor pool.

Numerous attempts have been made in the past, to lighten traditional, earthen based aggregate building blocks. Crushed shells, foaming agents, recycled plastics and other organic extenders have only resulted in increased production costs.

Any number of attempts have been made to improve insulation values, such as supplemental thermal based inserts or sandwich treatments resulting in higher product costs.

Such weight, insulation and labor cost deficiencies has rendered the value and preponderance of use of cement building blocks limited to commercial and industrial uses, and in below grade, residential applications.

In many areas, monolithic, poured-in-place or tilt-up concrete wall systems have proved more cost effective than traditional, mortar stacked cement block systems. To date, the degree of mechanization required for such systems has proved too impractical for broad based residential use.

In those geographic areas where cement block is used in above ground residential applications, supplemental accommodations are required in order to improve aesthetic acceptance, achieve satisfactory insulation levels and overcome moisture accumulation problems.

A number have made rather elaborate attempts to improve the erection process and insulation value for building block systems such as U.S. Pat. No. 5,226,275 to Trahan of Canada, U.S. Pat. No. 5,181,362 to Benitez, U.S. Pat. No. 4,651,485 to Osborne, U.S. Pat. No. 4,896,472 to Hunt, U.S. Pat. No. 4,640,071 to Haener, U.S. Pat. No. 4,573,301 to Wilkinson, U.S. Pat. No. 4,769,964 to Johnson et. al. and U.S. Pat. No. 4,314,431 to Rabassa. Unfortunately, all fall short of meeting any combined, lighter weight/more surface cost effective, optimum insulation value and lower erection skill level test.

Derivative products such as U.S. Pat. No. 5,241,795 to Giroux et. al. and U.S. Pat. No. 4,947,611 that attempt to either, lighten the product, improve the insulation value, or improve surface coverage values, either result in higher labor costs or require some manner of supplemental, structural support mechanism.

Adobe block machines such as U.S. Pat. No. 4,640,671 to Wright and U.S. Pat. No. 4,557,681 also to Wright et. al., do improve insulation values and lessen labor intensity over cement block. However, such systems are more critically dependent on soil-specific conditions that tend to limit their effective feasibility according to the availability of certain soil-specific geological conditions.

All building block systems heretofore known, suffer from one or more of the following disadvantages:

(a) They require an earthen based aggregate base such as sand, crushed stone or shells, or other heavy textured clay soil making them heavier, and more dependent on soil specific geological conditions.

(b) They have low thermal insulation values, rendering them less energy efficient.

(c) Weight impacts surface area coverage. The heavier the block, the smaller the amount of surface area it can practicably cover, thus more blocks and more unit labor costs are required to cover the same surface area that lighter, larger blocks can cover.

(d) Earthen based aggregate must be dug and transported to a central production facility and then a finished product transported to the end use site, thus increasing costs.

(e) They are reliant on a finite natural resource wherein access and availability has greater cost impact.

(f) They require higher skill levels in erecting, and are not readily perceived, utilized or accepted as a do-it-yourself building product.

(g) the scale of production for traditional, earthen based building blocks has essentially targeted the commercial or industrial level of use and application.

The related art in general, and these patents in particular, do not disclose a process and apparatus for processing and compressing a novel, vegetable based, aggregate base into a light weight, structurally independent, thermally positive, self-aligning, fiber building block which comprises this invention.

OBJECTS AND ADVANTAGES OF THIS INVENTION

It is estimated that in the U.S., enough grain straws alone are annually generated to construct over five million homes, better than triple current home building levels. Straw and other like fibrous materials represent a residual by-product generated by other primary products. Such primary products as wheat, oats and the like are likely to remain in strong world wide demand, thus insuring a stable and cost effective supply of this novel aggregate base. A lack of any meaningful value-added use for such residual by-products often necessitates the burning off of this low value by-product, resulting in a negative environmental impact.

This instant novel invention produces a lighter weight, higher thermal value, less labor intensive building block at a scale of production that promises the kinds of innovative and novel economic opportunities that strengthen farming and insures sound economic development of rural communities. In the process, it serves to create a viable, value-added market for such an invaluable resource.

Accordingly, the need exists for a process and apparatus that novelly produces a vegetable based aggregate base, suitable for high quality, high volume production of a fiber building block which includes several objects and advantages of the instant invention which are:

(a) to provide a fiber building block capable of utilizing a universally abundant, naturally renewable aggregate base that is produced as a residual by-product of a market driven primary product.

(b) to provide a fiber building block that achieves energy efficiency by virtue of thermal values inherent in it's vegetable based, aggregate base and does not require supplemental materials or devices in order to increase energy efficiency.

(c) to provide a larger, lighter weight fiber building block capable of producing greater per unit surface coverage value, thus improving unit and labor cost effectiveness.

(d) to provide a fiber building block capable of achieving positive environmental impact by lessening the need for burning straw and other residual fibrous materials.

(e) to provide an environmentally positive fiber building block that reduces pressures on environmentally strained timber and surface mined resources.

(f) to provide a fiber building block capable of creating a value added market for residual, agriculture by-products, such as straw and the like, which in turn bring greater efficiencies to farming and improve the feasibility for productive utilization of marginal lands.

(g) the relocatable nature of this fiber building block apparatus offers a new scale of production that optimize transportation efficiencies between raw material source and end use site.

(h) to provide a new scale of value-added, micro-production opportunities consistent with traditional farming skills and rural economic development needs.

(i) to provide a self-aligning, fiber building block that reduces skill levels to the do-it-yourself level, so as to expand opportunities for people to effectively participate in building their own home, thus making housing more affordable for more people.

(j) to provide a self-aligning, mortarless, fiber building block capable of reducing labor erection costs.

(k) to provide an integrated production process capable of:

1. altering the size and texture of one or more vegetable based, fibrous materials to create a fibrous aggregate base.
2. providing an appropriate measurement of said fibrous aggregate base.
3. beating, mixing and blending said aggregate base with one or more dry components.
4. introducing one or more liquid, air or gaseous materials in to the mixed and blended materials.
5. compressing the mixed and blended materials, within a mold, into fiber building blocks of one or more sizes, thicknesses or densities.
6. ejecting a completed fiber building block from said mold.

Still further, when constructing a fiber building block wall utilizing the blocks produced by the apparatus of the instant invention, the upper surface of each course of fiber blocks may be coated with a slurry coat of a plurality of cementing like substances before the next course of fiber blocks is placed thereover. In this manner the self-aligning mechanism of the instant invention, plus the absorbant planar upper and lower surfaces of the fiber blocks may bind, align and unite tightly together as said slurried cement like substance integrates said surfaces, thus creating a homogenous and integrated fiber block wall.

Still further objects and advantages will become apparent from a consideration of the ensuing description and drawings.

DESCRIPTION OF THE DRAWINGS

In the drawings, closely related figures have the same number but different alphabetic suffixes.

FIG. 5 is a fragmentary end view of a retractable bottom.

FIG. 6 is an isometric view of a finished fiber building block with a self-aligning feature.

FIG. 7 is an end view of a staggered coursing of a plurality of finished, self-aligning fiber building blocks.

FIG. 8 is a fragmentary end view of the self-aligning mechanism on the bottom surface of a compression surface plate and on the upper surface of a retractable bottom surface plate.

REFERENCE NUMERALS IN DRAWINGS

| | | | |
|---|---|---|---|
| 10 | frame | 12 | wheeled axle assemblies |
| 14 | adjustable jacks | 16 | receiving chamber |
| 18 | advancement roller | 20 | un-cut fibrous materials |
| 22 | reduction chamber | 24 | aggregate cutting blades |
| 26 | reduction chamber axle | 28 | radial blower blades |
| 30 | aggregate hopper | 32 | aggregate base |
| 34 | aggregate transmission duct | 36 | auxiliary radial blower |
| 38 | upstanding front plate | 40 | upstanding rear plate |
| 42 | top plate beam | 44 | bottom plate beam |
| 46 | mounting support plate | 48 | compression chamber foundation plate |
| 50 | retractable bottom assembly foundation plate | 52 | dividing hat |
| 54 | channel A | 56 | channel B |
| 58 | measuring chamber | 60 | upper measuring chamber door |
| 62 | bottom measuring chamber door | 64 | beating/mixing chamber |
| 66 | roller axle | 68 | beating mixing fingers |
| 70 | dry jet sprays | 72 | homogenous form |
| 74 | bottom beating/mixing chamber door | 76 | wet jet sprays |
| 78 | wetting chamber | 80 | collection chamber |
| 82 | compression chamber | 84 | compression chamber platform |
| 86 | outer compression chamber wall plate | 88 | compression chamber foundation wall |
| 90 | stop | 92 | rollers |
| 94 | roller channel | 96 | compression surface plate |
| 98 | ram assembly | 100 | ram assembly piston |
| 102 | compression head | 104 | compression plate |
| 106 | compression head guide rod | 108 | compression head guide rod channel |
| 110 | retractable bottom surface plate | 112 | inner compression chamber wall plate |
| 114 | retractable bottom plate | 116 | discharge conveyor assembly |
| 118 | compression chamber reinforcing ribs | 120 | retractable bottom assembly |
| 122 | outer retractable bottom assembly foundation plate | 124 | inner retractable bottom assembly foundation plate |
| 126 | retractable bottom assembly bottom plate | 128 | retractable bottom assembly reinforcing frame |
| 130 | reinforcing bibs | 132 | retractable bottom |
| 134 | retractable bottom roller conveyor assembly | 136 | retractable bottom assembly support plates |

DESCRIPTION OF THE PREFERRED EMBODIMENT

Referring now more specifically to the drawings, the numeral 10 generally designates the platform frame to which the apparatus is anchored. Said frame 10 may be towed behind a towing vehicle (tandem) attached strategically to the frame along with two pair of opposite side front and rear adjustable jacks 14 that serve to stationarily support said frame from the ground. Alternatively, by removing said wheeled axle assemblies 12 and said adjustable jacks 14, said frame 10 may be stationarily secured to a more permanent type foundation (not shown).

Figure 1:
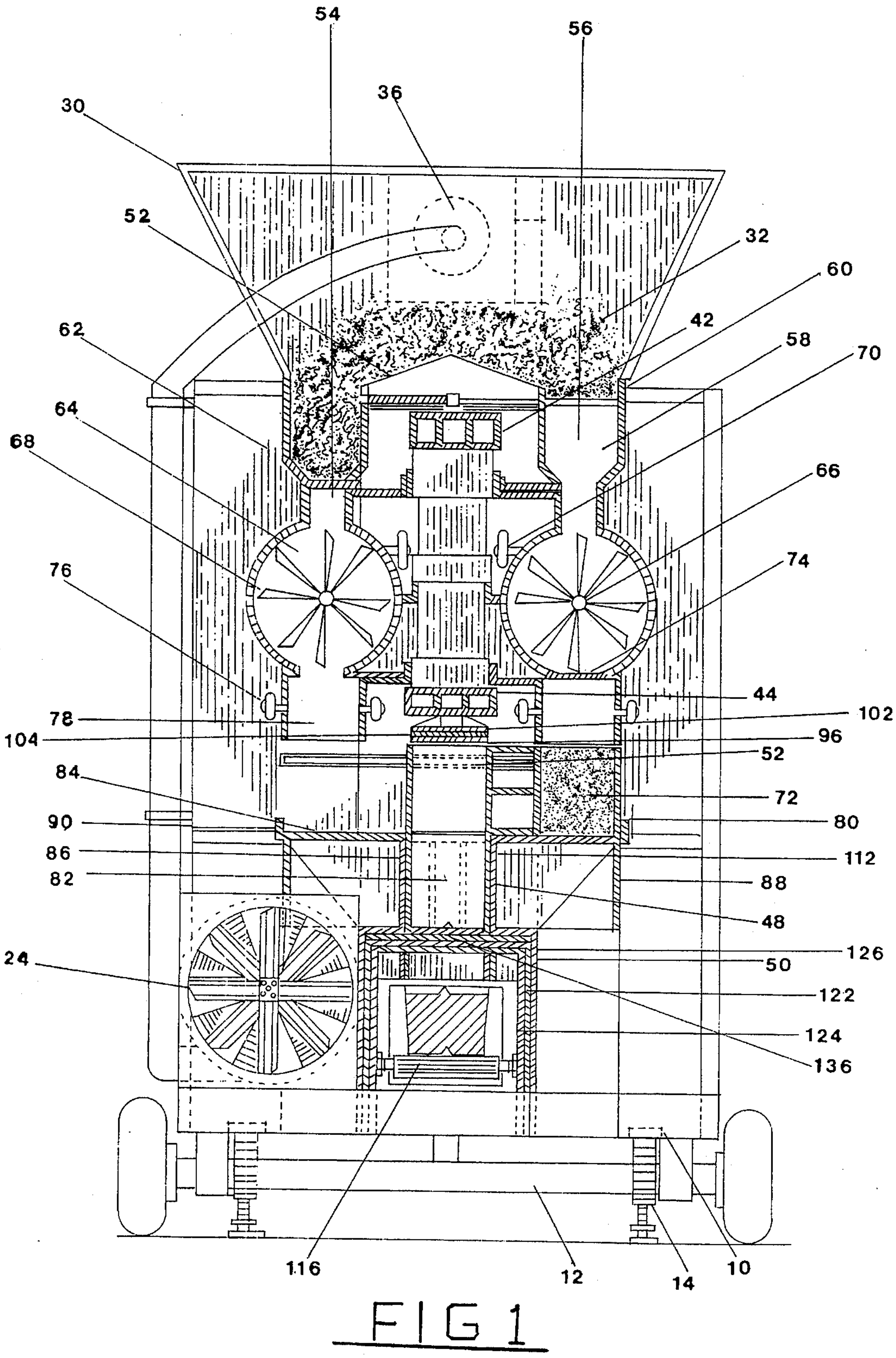
FIG. 1 is a fragmentary front end elevation view of a portion of the instant invention and of the frame on which it is mounted.
Figure 2:
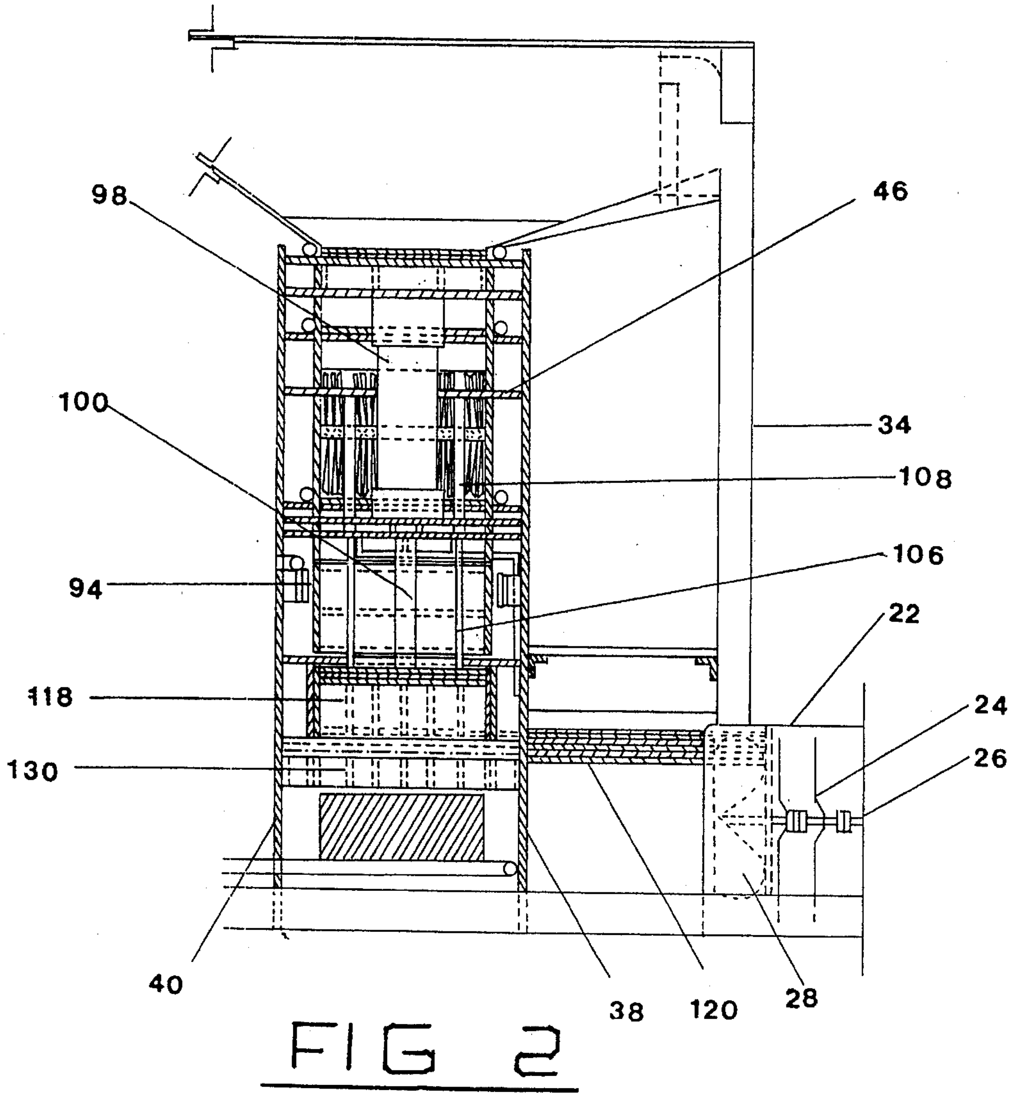
FIG. 2 is a fragmentary side elevation view of a portion of the instant invention and of the frame on which it is mounted.
Figure 9:
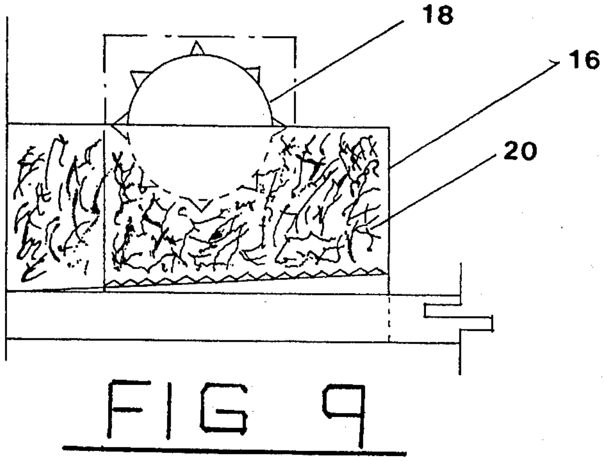
FIG. 9 is a fragmentary side view of a reduction chamber.

This process and apparatus for processing and compressing un-cut vegetable based, fibrous materials 20 into fiber building blocks represents a plurality of actions that is initiated when un-tied, un-cut fibrous bales are fed, by gravity means, into a receiving chamber 16 shown in FIG. 9 of this instant invention. Said un-cut, un-tied fibrous bales are then further reduced and loosened by means of a mechanically powered (power source not shown) advancement roller 18 that downwardly compresses said uncut fibrous materials within said receiving chamber 16.

Tooth like projections FIG. 9 outwardly extend from a surface of said advancement roller 18. The rotational movement of said advancement roller 18 forwardly communicates said loosened un-cut fibrous materials 20 into a path of a negative air-flow generated within a forwardly attached reduction chamber 22.

Rotational speed of said advancement roller 18 may be manually controlled, or in an alternative manner, sequenced in accordance with instructions communicated to said power source (not shown), by a computer related sensor (computer and sensor not shown) located at an uppermost position within an aggregate hopper 30. Alternatively, loosened, un-baled, un-cut fibrous materials 20 may be fed into a modified receiving chamber (not shown) that extends vertically, having a conical lip attached thereto into which loose fibrous materials may be deposited.

A plurality of one or more aggregate cutting blades 24 are demountably secured to a horizontally positioned reduction chamber axle 26 centrally positioned in said aggregate reduction chamber 22. Said reduction chamber axle 26 is mechanically driven by a power source (not shown), backwardly located apart from said reduction chamber 22.

Said aggregate cutting blades 24 are manipulated by said reduction chamber axle 26 in a rotational direction, at one or more manual or computer controlled speeds judged capable of determining a desired cut length, texture and consistency of one or more un-cut fibrous materials 20.

Figure 3B:
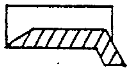
FIG. 3 is a fragmentary isometric view and end view of a cutting blade assembly located in a reduction chamber.
Figure 3A:
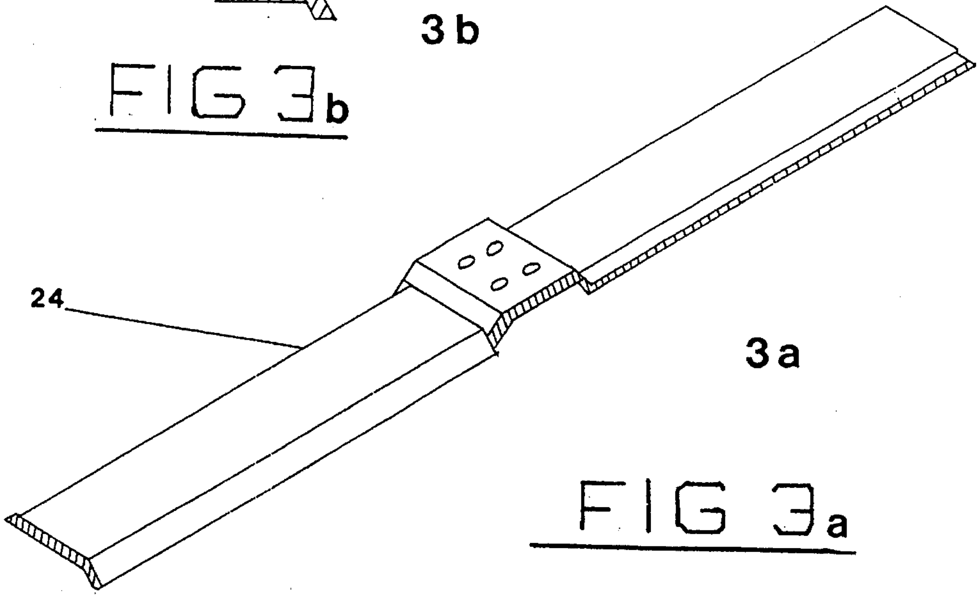

Said aggregate cutting blades FIG. 3 consisting of a cutting edge located on a forward surface of said aggregate cutting blade 24 shaped to cut or reduce said un-cut fibrous materials 20 in to an aggregate base 32. An air-flow fin FIG. 3 appropriately angled on a backwardly surface of said aggregate cutting blade 24 is shaped to create a negative air-flow capable of transversely drawing said un-cut fibrous materials 20 across a cutting path of said forwardly located cutting edge of said aggregate cutting blade 24. Additionally, said air-flow fin is designed to backwardly communicate said aggregate base 32 in to a backwardly adjoining negative air-flow generated by a plurality of laterally positioned radial blower blades 28.

Said aggregate cutting blades 24 may be configured in one or more thicknesses, cutting edge plane angles, and air-flow fin angles sufficient to accomplish said cutting or reduction process according to the properties, thicknesses, textures, composition and the like of a plurality of vegetable based fibrous materials.

Said plurality of radial blower blades 28, axially and backwardly positioned from said aggregate cutting blades 24 are demountably secured to said reduction chamber axle 26. Said radial blower blades 28 correspondingly follow a rotational direction of said aggregate cutting blades 24 and are disposed to create a negative air flow that both, attracts said un-cut fibrous materials 20 transversely across a path of said preceding rotating aggregate cutting blades 24, and creates a sufficient dispersal blowing force to communicate said aggregate base 32 upwardly through a laterally connected and vertically secured, aggregate transmission duct 34 and in to said aggregate hopper 30.

An additional embodiment of said reduction chamber 32 may consist of a similarly configured cutting blade apparatus secured in a self-contained housing located ancillary to said frame 10, but capable of mass producing said cut and reduced aggregate base 32. Bulk supply of said cut and reduced aggregate base 32 could then be deposited or communicated in to said aggregate hopper 30, either attached to said apparatus or ancillaryly detached but approximate to said apparatus.

An auxiliary radial blower 36 located at a centrally located upper outer surface of said aggregate hopper 30, provides supplemental negative air-flow that upwardly draws, within said aggregate transmission duct 34, said aggregate base 32 discharged from said reduction chamber 22, and distributes said cut aggregate base 32 in to said aggregate hopper 30.

Said frame 10 supports an assembly of interconnected parts consisting of a pair of opposite side upstanding front plate 38 and rear plate 40 vertically connected therefrom, which are horizontally inter-secured thereto by a pair of top plate beam 42 and bottom plate beam 44, a pair of mounting support plates 46, a pair of compression chamber foundation plates 48, and a pair of retractable bottom assembly foundation plates 50, all longitudinally inter-secured therebetween serving to provide a structural assemblage from which to attach other apparatus components thereto.

Said upstanding front plate 38 and rear plate 40 support on an uppermost surface said aggregate hopper 30 consisting of four contiguously attached sloped sides and a contiguously attached top containing a removable access panel (not shown). Said aggregate base collected in said aggregate hopper 30 are gravitationally communicated by means of said horizontally sloped sides and a longitudinally placed dividing hat 52 all serving to separate a flow of aggregate base materials towards two downwardly paralleled processing channels A 54 and B 56. Accordingly said aggregate base is deposited in a measuring chamber 58 aligned in either channel A 54 or B 56 both of which define an uppermost stage of processing.

An alternative embodiment of said aggregate hopper 30 may consist of a separate but similarly configured aggregate container located in an ancillary, approximate location in a manner sufficient to communicate said cut and reduced aggregate base 32 to said measuring chamber 58.

Said aggregate base 32 is communicated by gravitational means, downwardly progressing through parallel, sequentially connected chambers vertically aligned in channel A 54 and B 56. Processing sequence is the same for both channels but take place in alternating fashion. For illustration purposes, we will follow the progress of said aggregate base 32 through Channel B 56.

Initially, an upper measuring chamber door 60 is horizontally withdrawn by mechanical means (not shown), allowing said aggregate base 32 to gravitationally deposit within said measuring chamber 58. Once said measuring chamber 58 is filled, a sensor (not shown) located in approximation to an upper measuring chamber door 60, communicates said filled status to computer (not shown) which then activates a mechanical closure (power source not shown) of said upper measuring chamber door 60 so as to stop additional aggregate base 32 from entering said filled measuring chamber 58.

Said closure of said upper measuring chamber door 60 engages sensor (not shown) to communicate through said computer (not shown) a simultaneous mechanical withdrawal (power source not shown) of a bottom measuring chamber door 62, thus downwardly evacuating all aggregate base 32 from said measuring chamber 58 and depositing said measured aggregate base 32 gravitationally in to a downwardly aligned beating/mixing chamber 64.

Withdrawal of said bottom measuring chamber door 62 as well, activates a rotational movement of a roller axle 66, horizontally and demountably secured central to a longitudinally positioned, cylindrically shaped dry beating/mixing chamber 64. Said roller axle 66 is powered by mechanical means (not shown) laterally located outside of said dry beating/mixing chamber 64.

Said aggregate base 32 communicated in to said dry beating/mixing chamber 58 is deposited into a rotating path of a plurality of beating/mixing fingers 68 demountably secured to said roller axle 66.

A sensor (not show) engaged by discharge of all said aggregate base 32 from said measuring chamber 58, simultaneously activates mechanical closure (power source not shown) of said bottom measuring chamber door 62. A sensor (not shown) engaged by closure of said bottom measuring chamber door 62 activates a plurality of pressurized, dry jet sprays 70 (pumping and metering source not shown) demountably secured through an outer wall of said beating/mixing chamber 64.

Said pressurized, dry jet sprays 70 introduce a dry mix of one or more materials in to an orbital path of said aggregate base 32 generated by a rotational motion of said beating/mixing fingers 64.

Said pressurized, dry jet sprays 70 may introduce into said dry beating/mixing chamber 64 one or more, measured and metered, dry binder, adhesive, cement, hardening, or filler materials such as Portland cement, fly ash, clay dust, animal protein adhesives, lignin and other natural binders, organic resins, resin hardeners or catalysts, accelerators, extenders or hardeners and the like.

Said measured and metered dry materials are communicated to said dry jet sprays 70, by means of a plurality of hoses, tubes or conduits (not shown), from one or more dry supply hoppers or tanks (not shown) that may be secured to said structural assemblage system.

In an alternative embodiment, said measured and metered dry materials may be pumped and metered by a similar system (not shown) and communicated by means of a similar system of hoses, tubes or conduits, from ancillary, detached supply hoppers or tanks located apart from said frame.

Figure 4:
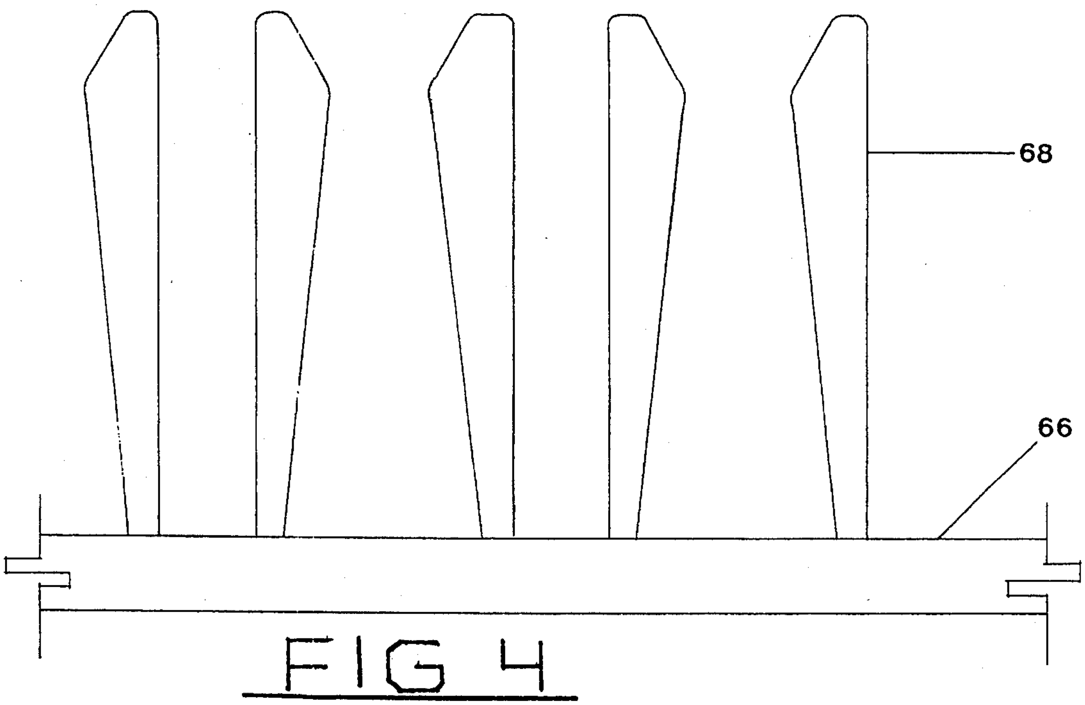
FIG. 4 is a fragmentary side view of a plurality of beating/mixing fingers mounted on a roller axle located within a beating/mixing chamber.

Said beating/mixing fingers 68 may also serve to beat and extract any natural lignins left remaining in said aggregate base 32 and blend said natural lignins in to the combined dry mix rotating within said beating/mixing chamber 64. Said beating/mixing fingers 68 are demountably secured to said roller axle 66 so as to rotate said mixed and blended materials in an orbital direction, but are each alternatively, angularly disposed and shaped FIG. 4, so as to at the same time, laterally direct said dry mix and aggregate base 32 in to said orbital rotation, so as to insure that all deposited aggregate base 32 and said dry materials, are entirely dispersed in to a homogenous form 72.

Said beating/mixing fingers 68 may, in an alternative embodiment, consist of one or more configurations, such as an auger type or the like device having a solid or perforated surface capable of both orbitally and laterally beating and mixing said aggregate base 32 with said dry materials.

After said aggregate base 32 and dry materials has been rotated and mixed for a prescribed period of time, controlled by manual or preset computer means, said dry bottom beating/mixing chamber door 74 is mechanically withdrawn, allowing said homogenous form 72 of aggregate base 32 and dry materials to pass through a downwardly aligned, open top and bottom wetting chamber 78, and deposited in to a downwardly aligned, open top and bottom materials collection chamber 80.

A sensor (not shown), engaged by withdrawal of said bottom beating/mixing chamber bottom door 74, activates a plurality of pressurized wet: components jet sprays 76 (pumping and metering system not shown) demountably secured through opposing outer walls of said downwardly aligned wetting chamber 78.

Said pressurized wet components jet sprays 76 impel one or more wet components such as water, air, gases, liquid hardeners, accelerators or other liquid borne adhesives, cements, binders, catalysts and the like transversely across and amongst said downwardly falling homogenous form, in densities sufficient to complete one or more hydration, catalytic or other wetting actions necessary for compression of said homogenous form in to a structurally independent, fiber building block.

A sensor (not shown), engaged by the complete evacuation of all said homogenous form 72 from said dry beating/mixing chamber 64, communicates closure of said bottom beating/mixing bottom door 74.

Said wetting components are pumped and metered (source not shown) to said pressurized wet components jet sprays 76 by means of a plurality of hoses, tubes or conduits and the like (not shown), from one or more wet components supply hoppers or tanks or the like (not shown) that may be attached to said structural assemblage support system, or may, in the alternative, by similar means, be communicated from one or more detached ancillary wet components supply hoppers or tanks or the like.

Said open top and bottom collection chamber 80 consists of two parallel compartments, each consisting of four opposing sided and closed plates, with said compartments joined by a separator that insures registration of each compartment of said collection chamber 80 with either the lower end of a wetting chamber 78, upwardly aligned in either channel A 54 or B 56, or with an upper end of a compression chamber 82.

Said collection chamber 80, having no fixed top nor fixed bottom, uses a horizontally and downwardly positioned compression chamber platform 84, secured to an upper surface of said compression chamber 82 to define a bottom closure for said collection chambers 80. Said compression chamber platform 84 is horizontally secured to an upper surface of four, outer compression chamber wall plates 86 and an upper surface of a pair of longitudinally secured compression chamber foundation walls 88. Two stops 90 insure proper registration and removability of said collection chamber 80 and are demountably secured to said compression chamber platform 84.

Horizontal communication of said mechanically powered (power source not shown) collection chamber 82 is facilitated by means of a plurality of rollers 92 demountably secured on an opposing, outwardly surfaces of said collection chamber 80 and are removably seated within a bottom lip of opposing sided roller channels 94, each secured to said upstanding front plate 38 and rear plate 40.

Said rollers 92 and roller channels 94 provide a means for said collection chamber 80 to transport said collected homogenous form 72 laterally across an upper surface of said compression chamber platform 84 until such time an open bottom of said collection chamber 80 is downwardly registered with an open top of an upwardly aligned surface of said compression chamber 82, and upwardly registered with peripheral surfaces of a compression surface plate 96 of a high pressure ram assembly 98. Achieving said status, insures all said homogenous form 72 to be gravitationally deposited in to said downwardly positioned compression chamber 82.

Top plate beam 42 and bottom plate beam 44 secure said vertically aligned, high pressure ram assembly 98 having a downwardly extendable and upwardly retractable ram assembly piston 100 that vertically extends through bottom plate beam 44. A compression head 102 is demountably secured, longitudinally to a downward extremity of said retractable ram assembly piston 100. A compression plate 104 is longitudinally registered, and demountably secured to a bottom surface of said compression head 102 and demountably secured to a bottom surface of said compression plate 104 is a compression surface plate 96 which may be made of one or more resilient, elastomer type materials designed to minimize friction between compression surface plate 96 and a finished surface of a self-aligning, fiber building block FIG. 6.

Said compression surface plate 96 may contain one or more longitudinally scored or registered female indentations FIG. 8, as a means of insuring one or more, defined male like protrusions vertically extending from an upper surface of a finished self-aligning fiber building block FIG. 6. Said defined male like protrusion FIG. 8, when vertically mated and inserted in to a corresponding female like indentation extruded or registered on an opposing surface of a mating bottom side of an upwardly applied and stacked fiber building block, insures a self-aligning mechanism for aligning surfaces of a vertically extended fiber building block wall FIG. 7.

In an alternative embodiment, said scored female indentation may consist of one or more shapes or depths and may continue longitudinally from one end surface edge to an opposing end surface edge.

A pair of compression head guide rods 106, vertically aligned with a center axis of said high pressure ram assembly 98, are demountably secured to an upper surface of said compression head 102. Said compression head guide rods 106 vertically extend through bottom beam # plate beam. 44 to register with an inside surface of a compression head guide rod channel 108. Said compression head guide rod channel 108 is vertically secured between the upper surface of said bottom plate beam 44 and the lower surface of said mounting support plates 46, allowing said compression head guide rods 106 to freely follow a downward extension and upward retraction movement of said compression head 102.

Compression action of said downwardly extending compression surface plate 96, vertically passing through said open top and bottom collection chamber 80, makes closure of said homogenous form 72 within said compression chamber 82 and against a retractable bottom surface plate 110 demountably secured to a retractable bottom plate 114.

Said retractable bottom surface plate 110 is downwardly registered with the outward surfaces of four, opposing sided, vertically extending outer compression chamber wall plates 86 of said compression chamber 82. Said downward extension of said compression surface plate 96 is actuated by a computer linked sensor (not shown) that registers proper vertical alignment of said collection chamber 80 with said downwardly aligned compression chamber 82.

A computer linked sensor (not shown) registers a preprogrammed compression level of said compression surface plate 96 and actuates a lateral withdrawn (by mechanical means not shown) of said retractable bottom plate 114 from an open bottom of said compression chamber 82. Complete withdrawal of said retractable bottom plate 114 engages a computer linked sensor (not shown) which causes a further downward extension of said compression surface plate 96, thus insuring a downward ejection of a finished fiber building block on to a discharge conveyor assembly 116 disposed beneath said compression chamber 82 and a retractable bottom assembly 120.

A downwardly extending pressure of said compression surface plate 96, is actuated by a computer circuitry including solenoids, output conductors and other appropriate means (not shown) capable of insuring one or more specified compression levels of said homogenous form 72 against said retractable bottom surface plate 110.

Said compression chamber platform 84 defines a horizontal upper surface of said compression chamber 82, accepting that open top area defined by an inner surface of said four, opposingly sided, vertically extending outer compression chamber wall plates 86.

Said compression chamber 82 consists of said outer compression chamber wall plates 86 being secured to a plurality of compression chamber reinforcing ribs 118 laterally secured between said outer compression chamber wall plate 86 and said upstanding front plate 38 and rear plate 40 on one axis, and between said outer compression chamber wall plate 86 and said compression chamber foundation plate 48 on an opposing axis.

Four opposingly sided inner compression chamber wall plates 112, are demountably secured to said outer compression chamber side plates 86. Said inner compression chamber wall side plates 112 may consist of a plurality of thicknesses, as a means of achieving one or more fiber building block surface plan areas.

Attention is drawn to said retractable bottom assembly 120, described in FIG. 5. Vertical configuration of said retractable bottom assembly 120 consists of a pair of outer retractable bottom assembly foundation plates 122 laterally secured between said upstanding front plate 38 and rear plate 40, and between two pair of inner retractable bottom assembly foundation plates 124 laterally secured in like manner, all vertically secured from said frame 10.

Horizontal configuration of said retractable bottom assembly 120 consists of four stationary layers of retractable bottom assembly bottom plates 126, accepting a cut-out or opening defined by an outer surface line of said upwardly aligned outer compression chamber wall plates 86, horizontally secured to an inner surface of said outer retractable bottom assembly foundation plate 122 and vertically supported by and secured to an upper surface of said inner retractable bottom assembly foundation plates 124.

A four sided vertical retractable bottom assembly reinforcing frame 128 downwardly aligns with said cut-out or opening, supporting said retractable bottom assembly bottom plates 126 and providing sufficient clearance for downwardly extension of said compression surface plate 96.

Said retractable bottom assembly reinforcing frame 128 is secured to a plurality of reinforcing ribs 130 that horizontally extend between said retractable bottom assembly reinforcing frame 128 and said upstanding front plate 38 and rear plate 40 on one axis and between said retractable bottom assembly reinforcing frame 128 and said outer retractable bottom assembly foundation plates 122 on an opposing axis.

A retractable bottom 132, consisting of a retractable bottom plate 114 and a retractable bottom surface plate 110 demountably secured to an upper surface of said retractable bottom plate 114 occupies a surface area defined by said cut-out or opening within the upper two layers of said retractable bottom assembly bottom plates 126. Said bottom surface plate 110 may be made of one or more resilient, elastomer type materials to minimize friction between retractable bottom surface plate 110 and a finished surface of a fiber building block.

A mechanically powered arm (not shown), actuated by computer circuitry sensors (not shown), laterally transports said retractable bottom 132 across the upper surface of the bottom two layer of said retractable bottom assembly bottom plates 126 and on to an upper surface of a laterally adjoiningly attached retractable bottom plate roller conveyor mechanism 134.

Said retractable bottom surface plate 110 may contain one or more male like detents, vertically and longitudinally extending on an upper surface of said retractable bottom surface plate 110 FIG. 8, as a means of insuring or imposing one or more, defined female like indentations on a bottom surface of a finished fiber building block.

Said defined female like indentation, when vertically mated to receive a corresponding male like vertical protrusion cast on an opposing, mating upper surface of a downwardly supporting stacked fiber building block, insures a self-aligning mechanism for aligning a surface of vertically extended fiber building block walls.

In an alternative embodiment, said male like detents may consist of one or more shapes or depths, and may continue longitudinally from one end surface edge to an opposing end surface edge. Although the description above contains many specifications, these should not be construed as limiting the scope f the invention but as merely providing illustrations of some of the presently preferred embodiments of this instant invention. For example, as previously disclosed, said reduction chamber, aggregate storage bin, dry and wet hoppers or tanks may be located ancillary to said frame. As well, said measuring, dry beating/mixing, and wet mixing functions may be located ancillary to said frame and communicated to said compression chamber by means of ducts, tubes, conveyors and the like.

Thus the scope of this invention should be determined by the appended claims and their legal equivalents, rather than by the examples given.

We claim:

1. A process for forming a building block comprising:

beating, mixing and/or blending a vegetable based, fibrous material aggregate base with one or more cementitious, adhesive or binding components to form a homogenous blend;

spraying said homogenous blend with one or more wetting components, as a means of communicating, combining with, and/or interacting said aggregate base with said cementitious, adhesive or binding components to cement, bind, hydrate, cure, harden, accelerate, catalyze, or contribute to cohesively enveloping said homogenous blend to form a homogenous mixture;

depositing, pouring or placing said homogenous mixture in to a mold, cast or chamber for a time sufficient for said homogenous mixture to combine and sufficiently adhere one to another, as a means of insuring sufficient containment, envelopment and structural integrity to be removed or ejected from said mold, cast or chamber and sufficiently cured for use as a building block.

2. A process according to claim 1 wherein the effective surface coverage area of said one or more wetting components is expanded by means of the introduction of one or more air or gaseous ingredients in to the stream of said one or more wetting components.

3. A process according to claim 1 further including a means of a mechanical or manual compressions or compacting, of said homogenous form, while said homogenous mixture is contained in said mold, cast or chamber, whereby the structural integrity of said building block is further enhanced.

4. A process according to claim 1 wherein filler is added during the beating, mixing and/or blending.

5. A process according to claim 1 wherein the wetting components are selected from the group consisting of water, air, gases, liquid hardeners, accelerators, liquid borne adhesive, cements, binders and catalysts.

6. An apparatus for forming a building block, comprising:

(a) a beating/mixing and/or blending means for beating/mixing and/or blending a plurality of an aggregate base with one or more cementitious, adhesive or binding materials, and optionally filler components, sufficiently to achieve a defined, homogenous blend suitable for forming a building block, (b) a wetting means through which said homogenous blend can be directed and communicated to absorb and or be surficially coated by one or more wetting components to aid in achieving an homogenous mixture, (c) a compression or compacting enclosure or mold means capable of sufficiently containing said homogenous mixture in a defined surface plan area, thickness, density and dimension, (d) a compression means capable of sufficiently compressing, compacting or shaping said homogenous mixture in a defined density, size, thickness, shape and form, finished building block.

7. The apparatus for forming a building block according to claim 6 wherein said apparatus further includes a means for measuring of specific quantities of said aggregate base.

8. The apparatus for forming a building block according to claim 6 wherein said apparatus further includes an aggregate measuring device comprising:

(a) a means for allowing the depositing of said aggregate base in to an aggregate measuring chamber, and (b) a means for the evacuation of said aggregate base from said aggregate measuring chamber in to said dry beating/mixing means.

9. The apparatus for forming a building block according to claim 6 wherein said beating/mixing means comprises:

(a) a beating/mixing chamber, (b) a means for supplying rotational movement of a plurality of beating/mixing fingers, (c) a means for maintaining an orbital, rotational flow of the contents of said beating/mixing chamber, (d) a plurality of beating/mixing fingers, consisting of a plurality of shapes, thicknesses, lengths, surface configurations and dispositions sufficient to insure an appropriate orbital and lateral beating/mixing of said aggregate base and said cementitious, adhesive, or binding materials, and optionally filler components in to a defined homogenous blend, (e) a means for the evacuation of said homogenous blend from said beating/mixing chamber.

10. The apparatus for forming a building block according to claim 6, further including an upper compression surface plate, and a bottom compression surface plate constructed from a hard, elastomeric material.

11. The apparatus for forming a building block according to claim 9 further including a self-aligning mechanism wherein said self-aligning mechanism is configured both on an upper surface of a finished building block, and on a bottom surface of a finished building block, by means of manipulating a female, indentation on the bottom surface of an upper compression surface plate, that insures a corresponding, protruding male vertical extension on the upper surface of a finished building block, and by correspondingly manipulating a male, vertical extension on an upper surface of a bottom compression surface plate that insures a corresponding female, indentation on a bottom surface of an upwardly imposed, finished building block.

12. The apparatus for forming a building block according to claim 8 further includes a means for defining a plurality of capacities of said aggregate measuring chamber.

13. The apparatus of claim 6 further includes a means defining a plurality of defined surface plan areas of said finished block.

14. An apparatus for forming a building block, comprising:

(a) a frame, (b) a beating/mixing and/or blending means for beating/mixing and/or blending a plurality of said aggregate base with said one or more cementitious, adhesive or binding materials, and optionally filler components, sufficiently to achieve a defined, homogenous blend suitable for forming a building block, (c) a wetting means whereby said homogenous blend cam be directed and communicated to absorb and/or be surficially coated by one or more wetting components to aid in achieving said homogenous mixture, (d) a compression or compacting enclosure or mold means capable of sufficiently containing said homogenous mixture in a defined surface plan area, thickness, density and dimension, (e) a compression means capable of sufficiently compressing, compacting or shaping said homogenous mixture to a defined density, size, thickness, shape and form finished building block, (f) a means for allowing the ejection of said finished building block from said compression chamber, (g) a means of receiving un-cut fibrous materials.

15. An apparatus according to claim 14 wherein said aggregate base is generated by means of an aggregate reduction chamber comprising:

(a) a mechanically powered reduction chamber axle, (b) a plurality of reduction chamber cutting blades configured so as to provide a cutting edge on a leading surface, and an air-flow fin to generate a negative air-flow to assist in drawing said un-cut fibrous materials across the path of said leading edge cutting surface, (c) a plurality of radial blower blades configured so as to provide a negative air-flow within said reduction chamber capable of drawing said un-cut fibrous materials within the cutting path of said reduction chamber cutting blades and to further discharge said cut aggregate base from said reduction chamber.

16. The apparatus according to claim 14 wherein said cementitious, adhesive or binding materials, and optionally filler components are communicated to said beating/mixing and/or blending means by means of a plurality of cementitious, adhesive or binding materials, and optionally filler component introducing devices comprising:

(a) jet sprays/nozzles, (b) a pumping and metering mechanism, (c) a materials storage device, and (d) a hose, tube or conduit mechanism.

17. The apparatus according to claim 14 further including a means for delivering un-cut fibrous materials to said reduction chamber comprising:

(a) a demountably secured delivery chamber, (b) a demountably secured conveyor assembly, and (c) a demountably secured advancement roller.

18. The apparatus according to claim 14 further includes a means for communicating said homogenous form mixture said wetting chamber to said compression or compaction enclosure or mold.

19. The apparatus of claim 14 wherein said compression or compaction enclosure or mold is comprised of:

(a) four vertically aligned, opposing sided inner compression chamber wall plates, of one or more thicknesses, each demountably secured to a vertical surface of an opposing outer compression chamber wall plate, as a means of providing one or more building block surface plan areas, and (b) said outer compression chamber side plates are laterally secured by a plurality of compression chamber reinforcing ribs, laterally secured between said outer compression chamber wall plates and a pair of upstanding front and rear plates and on one axis, and a pair of opposing sided compression chamber foundation plates on an opposing axis.

20. The apparatus of claim 6 wherein a plurality of sensors, actuators and limit switches designed to confirm and actuate a plurality of mechanical movements and actions, and to operatively engage a plurality of mechanically powered, motor means, air compressors, hydraulic pumps, meters and/or pressure pumps are controlled by means of a pre-programmed computer, or in the alternative, manually manipulated.

* * * * *